United States Patent

Pontbriand et al.

[11] Patent Number: 6,123,113
[45] Date of Patent: *Sep. 26, 2000

[54] ASYMMETRICAL CONVOLUTE TUBE

[75] Inventors: Duane J. Pontbriand, Metamora; David Bensko, Oscoda; Gary O. Klinger, Warren, all of Mich.

[73] Assignee: ITT Manufacturing Enterprises, Inc., Wilmington, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/848,811

[22] Filed: May 1, 1997

[51] Int. Cl.⁷ ............................................. F16L 11/11
[52] U.S. Cl. ..................... 138/121; 138/119; 138/137; 138/DIG. 11
[58] Field of Search .................... 138/121, 119, 138/137, 122, 177, DIG. 11

[56] References Cited

U.S. PATENT DOCUMENTS

| | | | |
|---|---|---|---|
| 1,740,524 | 12/1929 | Schmidt | 138/177 |
| 1,813,039 | 7/1931 | Escol | 138/121 |
| 2,012,766 | 8/1935 | Meyer | 138/121 |
| 2,157,564 | 5/1939 | Peuthert | 138/121 |
| 2,695,038 | 11/1954 | Parce et al. | 138/121 |
| 3,738,394 | 6/1973 | Westerbarkey | 138/122 |
| 5,275,443 | 1/1994 | Klinger . | |
| 5,284,184 | 2/1994 | Noone et al. . | |
| 5,305,799 | 4/1994 | Dal Palù | 138/121 |
| 5,439,035 | 8/1995 | Dal Palu | 138/121 |
| 5,460,771 | 10/1995 | Mitchell et al. . | |
| 5,469,892 | 11/1995 | Noone et al. . | |
| 5,542,716 | 8/1996 | Szabo et al. . | |

FOREIGN PATENT DOCUMENTS

| | | | |
|---|---|---|---|
| 2755382 | 5/1998 | France . | |
| 406074375 | 3/1994 | Japan | 138/119 |
| 1220975 | 1/1971 | United Kingdom . | |
| 1562466 | 3/1980 | United Kingdom . | |
| 2266755 | 11/1993 | United Kingdom . | |
| 8501093 | 3/1985 | WIPO . | |

*Primary Examiner*—James F. Hook
*Attorney, Agent, or Firm*—Robert P. Seitter

[57] ABSTRACT

A tube having a cylindrical main body and a thin wall defined by an inner surface and outer surface. The tube includes a first segment having a generally constant cylindrical cross-section and another segment having a variable cross-section containing convolutions to allow for flexing of the tube during installation. The convolutions extend less than the entire circumference of the tube or have tapered side walls which substantially reduce the size of the convolutions as the convolutions extend from one position along the circumference to a second position.

16 Claims, 4 Drawing Sheets

ASYMMETRICAL CONVOLUTE TUBE

FIELD OF THE INVENTION

The present invention relates to a tube for use in motor vehicles, and more particularly, to multi-layer fuel lines and vapor return lines having corrugations spaced along their lengths located in areas of bending.

BACKGROUND OF THE INVENTION

Tubing is utilized for fuel lines and vapor return lines in automobiles. It is known to make tubing from multiple layers of synthetic material that can carry fuel and vapor. Each layer of material performs a different function. For example, an innermost layer might be resistant to fuel but allows vapor to pass through the layer. Another layer of different material may not be resistant to direct contact with fuel but provides an excellent vapor barrier. The layers are combined to form a tube that has excellent qualities which are not readily achievable using a single material.

Since vehicles have numerous parts confined in a relatively small volume, tubing must be able to accommodate any protruding parts that prevent the tubing from continuing in a straight line. As vehicles become more crowded with parts, the tubing necessarily must follow a more tortuous path. Thus, it is known to make multi-layer tubing which contains corrugations that are designed to expand and contract thereby allowing the tubing to flex. Flexing provides easier assembly of tubing into the vehicle.

Although corrugations in the tubes provide easier bending and manipulation during assembly, corrugations hinder fluid flow through the tube by creating turbulence. For instance, corrugations in a bend region of a fuel tank inlet hose introduce enough turbulence in the fuel flow that fuel tank filling time is noticeably increased, thereby reducing customer satisfaction.

SUMMARY OF THE INVENTION

The present invention is directed to a multi-layer tube having an elongated, generally cylindrical main body with a thin wall defined by an inner surface and an outer surface. The main body includes a first longitudinal segment having a generally constant cylindrical cross-section and a second longitudinal segment having a variable cross-section. The second segment includes a first region having a constant diameter wall and a second region located diametrically opposite the first region, the second region having one or more convolutions in the wall for allowing bending of the tube. The convolutions are positioned at predetermined locations and extend less than the entire circumference of the tube. The predetermined location is selected to be where bending may occur during assembly of the tube within, for example, a vehicle. Therefore, the inner surface of the tube at the second segment has a substantially smooth longitudinal portion located directly opposite a substantially irregular longitudinal portion. The irregular inner surface portion includes the convolutions.

For example, convolutions can be located at an inner radius of a bend while an outer radius of the same bend has no convolutions. Also, the convolutions can either be aligned longitudinally to allow bending or offset in a helical pattern in the longitudinal direction to allow a twisting motion to occur.

Finally, the present invention contemplates the convolutions having a longitudinal cross-sectional profile that is either squared, angled, or sinusoidal.

The tubing design of the present invention avoids the drawbacks of the prior art by tapering convolutions that extend around most of the tube circumference. The present invention alternatively provides truncated convolutions that extend only partially around the tube. Such asymmetrical convolutions reduce turbulence in flow while still accommodating ease of assembly.

The present invention also allows bending a tube at a smaller radius than would be practical with a smooth, non-corrugated tube. A bend having an even smaller radius can be accomplished by providing angled sides on the convolutions as opposed to straight, parallel sides.

In a preferred embodiment of the present invention, convolutions are formed so as to be located on the inner radius of a bend while the outer radius of the bend is relatively smooth. Such an arrangement reduces turbulence of fluid flow but preserves the ability to bend the tube.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
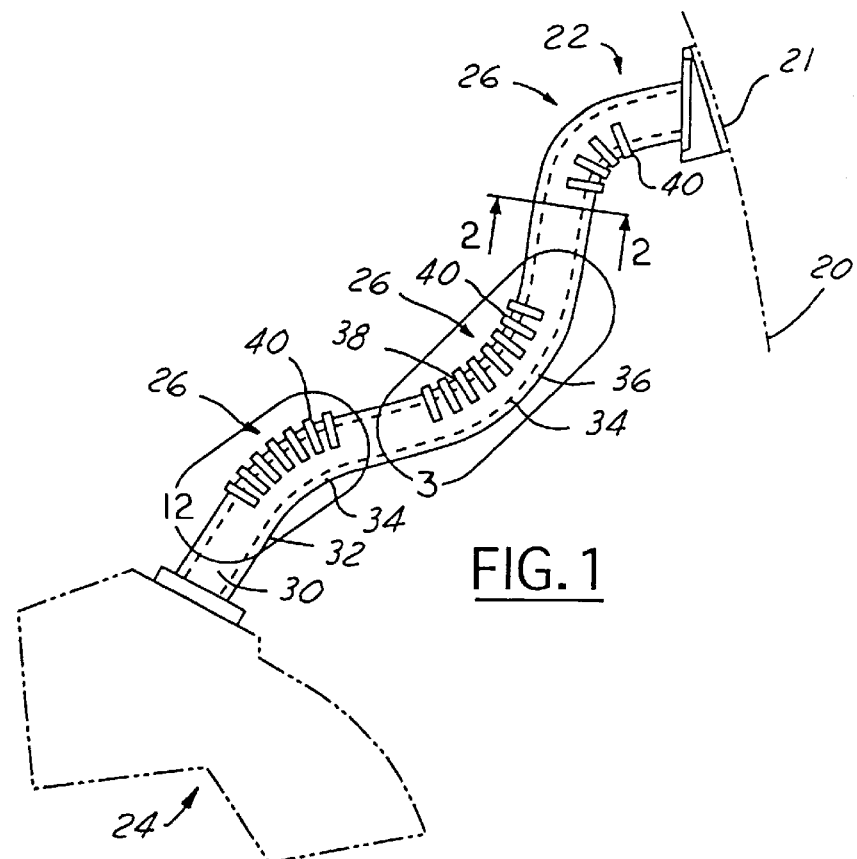
FIG. 1 is a perspective view of a fuel inlet hose according to the present invention.

FIG. 1 shows a portion of a motor vehicle 20 having a fuel inlet 21 and an inlet hose 22 for filling a fuel tank 24. Inlet hose 22 can be made of any suitable material including synthetic plastic material and can be either a single layer or multilayer tube. Inlet hose 22 must follow a tortuous path around several projecting parts (not shown) requiring inlet hose 22 to have a series of bends 26 in order to connect to fuel tank 24.

Hose 22 has a generally cylindrical main body 30 including longitudinal segments 32 which have a generally constant cylindrical cross-section with smooth inner and outer surfaces. Other longitudinal segments 34 have a variable cross-section including a first region 36 having a smooth, constant diameter wall and a second region 38 having a variable diameter wall diametrically opposite the constant diameter wall region 36. The variable diameter wall region 38 includes any number of convolutions 40 which are located to correspond with bends 26.

The convolutions 40 do not extend around the entire circumference of hose 22. Instead, convolutions 40 extend only part way around the circumference. The partial extension of convolutions 40 is designed to allow selective flexing of the tube without creating an unwanted degree of turbulence in fluid flow.

Convolutions 40 are longitudinally positioned along hose 22 at predetermined locations to correspond with potential areas where flexing is necessary to effect installation within vehicle 20. Convolutions 40 can be located at any longitudinal or circumferential location along hose 22. As illustrated, convolutions 40 are located at an inner radius of the middle and upper bends 26. However, lower bend 26 has convolutions positioned at its outer radius. By modifying particular convolution design factors, including width, height, shape, arc length, and spacing, convolutions can be located anywhere on the tube and still reduce the amount of turbulence.

Convolutions at an inner radius of a bend 26 tend to compress together, whereas convolutions located at an outer radius tend to expand or stretch. By varying the convolution design factors mentioned above, turbulence can be controlled. For instance, if convolutions are short, wide and spaced far apart before bending the tube, then the convolutions will tend to flatten out as they are stretched during bending if located on the outer radius. Flattening of the convolutions provides a relatively constant and smooth inner surface which greatly reduces turbulence.

Moreover, the particular location of a bend 26 is important for designing convolutions. For instance, in hose 22 the upper bend 26 preferably has convolutions 40 located only on an inner radius because fluid flow at the inlet 21 is at a maximum. Therefore, the smoother the outer radius, the less turbulence occurs at a crucial bend. In contrast, the lower bend 26 closest to fuel tank 24 is exposed to a lower rate of fluid flow than upper bend 26. The fluid loses energy as it travels over distance and changes direction in tube 22. Therefore, the turbulence effect from having convolutions 40 at an outer radius of lower bend 26 is not significant. However, the need for convolutions at the outer radius may be significant to allow flexing during hose installation. Therefore, the present invention controls the design and location of convolutions 40 to optimize flexing and minimize turbulence.

The present invention also encompasses providing a single hose design that can be used in several different types of vehicles. A multi-purpose hose according to the present invention would include extra convolutions at strategic locations for allowing flexing in a first vehicle application which may never be flexed in a second application. In addition, providing convolutions along straight sections of tube can build in some degree of flexing to account for minor misalignments between connection points, such as between a fuel tank and a fuel inlet.

While FIG. 1 illustrates a fuel inlet hose, it should be readily understood that the present invention can be applied to many different types of hoses, pipes, tubes and lines.

Figure 2:
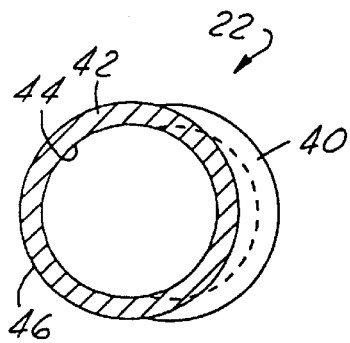
FIG. 2 is a cross-section taken through line 2—2 of FIG. 1.

FIG. 2 is a cross-section of hose 22 having convolutions 40 aligned in a same orientation in the longitudinal direction. Hose 22 includes a thin wall 42 having an inner surface 44 and an outer surface 46.

As illustrated, convolution 40 defines an arc that extends slightly less than half way around the circumference of hose 22. However, it is also envisaged that convolution 40 extend for as little as approximately 45 degrees or up to approximately 360 degrees. The degree of arc will depend on the required amount of bending, convolution profile, and the turbulence effect on fluid flow for a given application.

Preferably, convolutions 40 extend approximately one half of the circumference of hose 22 to provide a good balance between the need for bending and the need to minimize turbulence in fluid flow. Using half convolutions also simplifies tooling and manufacturing.

Figure 3:
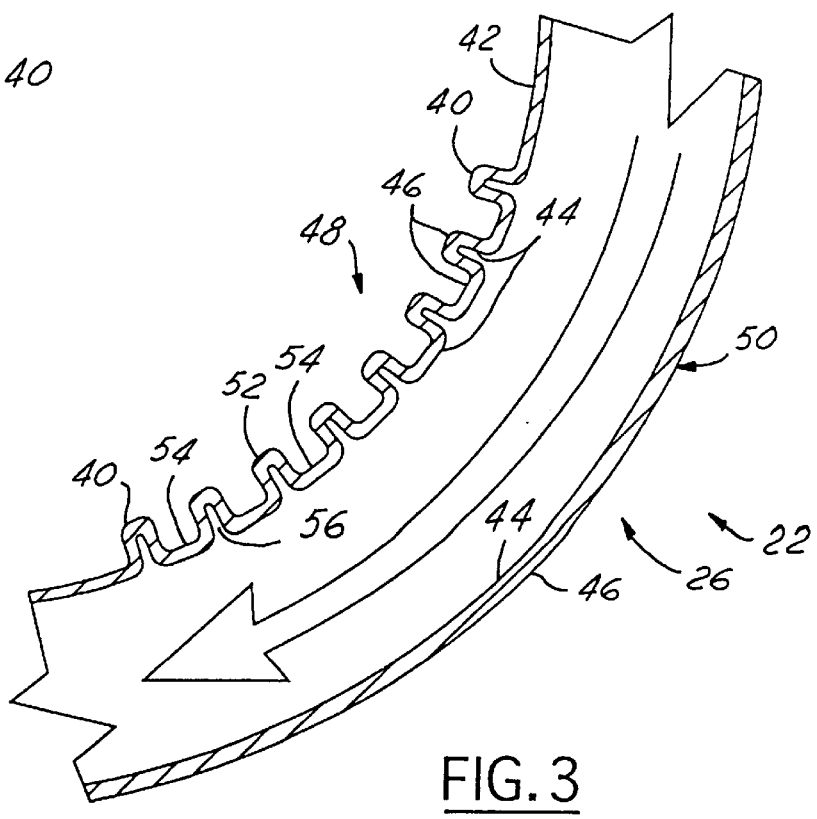
FIG. 3 is a partial side cross-section of FIG. 1 having convolutions on an inner radius of a bend and a smooth surface at an outer radius.

FIG. 3 shows a longitudinal cross-section of a hose 22 made according to the present invention. Convolutions 40 are preferably located at an inner radius 48 of bend 26 and do not extend to an outer radius 50 thereof. Outer radius 50 includes relatively smooth, substantially parallel, inner and outer surfaces 44, 46. In contrast, inner radius 48 has different diameters in its thin wall 42 created by a series of convolutions 40 compacted closely together to follow the curve of inner radius 48. Convolutions 40 project radially outwardly increasing the diameter of both inner and outer surfaces 44, 46. In between convolution peaks 52 are valleys 54 having substantially parallel inner and outer surfaces 44, 46. Valleys 54 are located approximately the same radial distance from the hose central longitudinal axis as thin wall 42 of outer radius 50. Grooves 56 are located between valleys 54. The cross-sectional profile of convolutions 40 can be any suitable shape including squared, angled, or sinusoidal. Therefore, hose 22 allows flexing by providing convolutions 40 at an inner radius 48. In addition, turbulence is reduced by providing a relatively smooth, non-convoluted inner surface 44 at outer radius 50.

In comparison, if convolutions 40 having the same size and shape are located at the outer radius of bend 26 they will cause a greater amount of turbulence during fluid flow. The reason for the increased turbulence is that convolutions at the outer radius 50 must expand or stretch farther apart than convolutions 40 at the smaller inner radius 48. The increased expansion creates greater distances between peaks 52 and valleys 54 of convolutions 40 which tends to increases the size of grooves 56. The larger the grooves 56 become, the greater the turbulence in fluid flow. Of course, as discussed previously, certain design factors can be changed to reduce or eliminate turbulence at an outer radius. However, it can be seen that having a constant shaped convolution extending the full circumference of a hose is not an optimal design. Therefore, the present invention provides asymmetrical convolutions to reduce turbulence.

Figure 12:
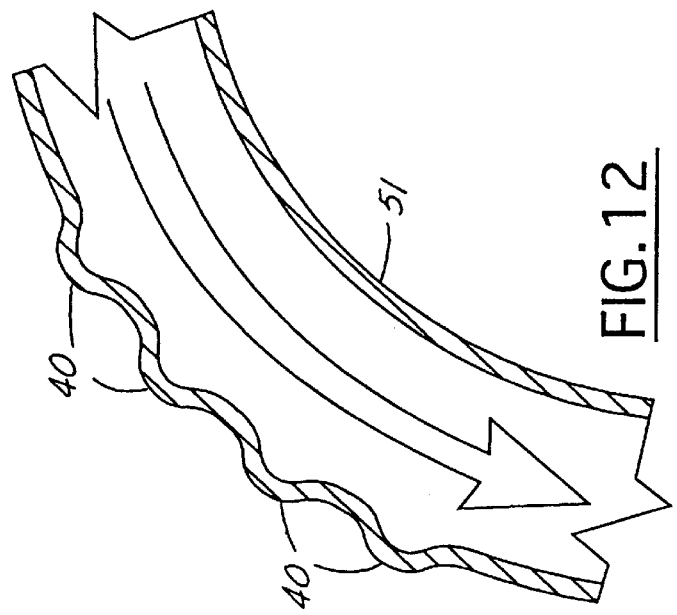
FIG. 12 is a partial side cross-section of FIG. 1 having convolutions on an outer radius of a bend and a smooth surface at an inner radius.

FIG. 12 shows a side view of longitudinal segment found within encircled portion 12 of FIG. 1. The longitudinal segment is generally similar to segment 60 shown in FIG. 4 except a tube 130' has a relatively smooth inner diameter 51 and convolutions 40 placed along its outer circumference. When convolutions 40 are placed along the outer radius, they tend to spread apart because the outside circumference is generally placed in tension. Because of this tension affect, the convolutions will give the general appearance as shown in FIG. 12 as that of a flowing wave and will not resemble the compact, choppy appearance of the convolutions of FIG. 3 which are placed on the inner radius of the bend.

Figure 4:
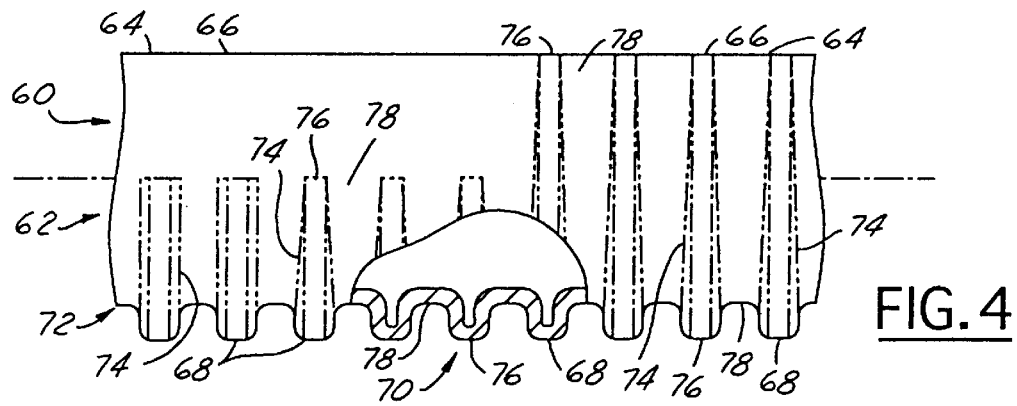
FIG. 4 is a side view of a tube according to the present invention.

FIG. 4 shows a side view of a longitudinal segment 60 of a tube 62 having a relatively smooth constant diameter wall region 64 near an upper portion 66. Segment 60 also has convolutions 68 spaced apart at regular intervals creating a variable diameter wall region 70 at a lower portion 72. Convolutions 68 include side walls 74 that can be parallel or tapered. Side walls 74 connect peaks 76 to valleys 78. A mixture of convolutions 68 having both parallel and tapered side walls 74 is also envisaged to allow bending at a smaller radius than is possible with convolutions 68 having only parallel side walls 74.

Figure 5:
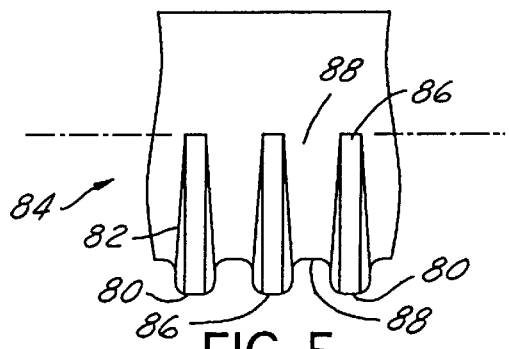
FIG. 5 is a side view of a tube having tapered convolutions.
Figure 6:
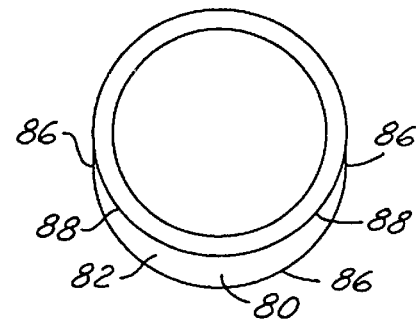
FIG. 6 is an end view of FIG. 5.
Figure 7:
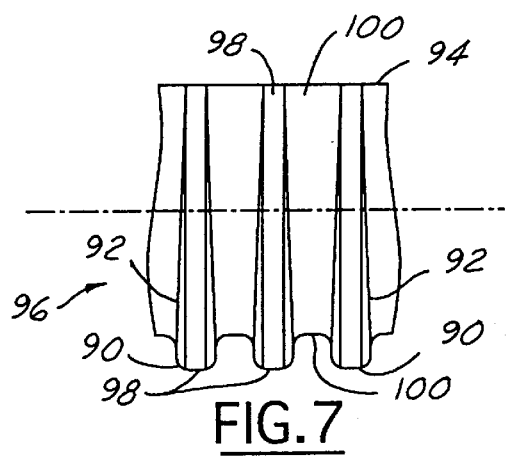
FIG. 7 is a side view of another embodiment having tapered convolutions.
Figure 8:
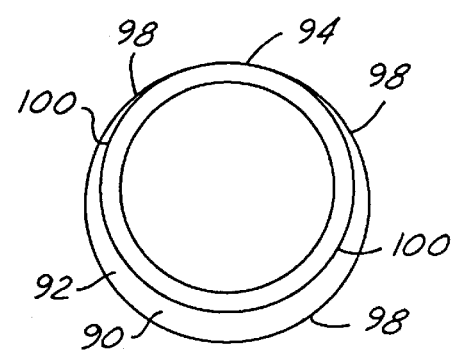
FIG. 8 is an end view of FIG. 7.

Referring now to FIGS. 5 through 8, convolutions 80, 90 are shown having tapered side walls 82, 92 that can be customized to suit particular application requirements. FIGS. 5 and 6 show convolutions 80 including tapered side walls 82 that converge or blend near the middle of tube 84. Peaks 86 and valleys 88 are connected by side walls 82 and also taper in size. The peaks 86 are largest away from the middle area while the valleys 88 are at their largest in the middle area. Another tapered convolution design is shown in FIGS. 7 and 8 where convolutions 90 have side walls 92 blending near the upper portion 94 of tube 96. The tapering side walls 92 are closer together near upper portion 94. As side walls 92 taper to blend, the distance between peaks 98 and valleys 100 becomes less and less. Also, the length of valleys 100 is increased while the size of grooves (not shown) are substantially reduced in both the axial and radial directions. Therefore, in the region of the blended side walls 92, the inner surface of tube 96 is relatively smooth which reduces turbulence. In this way, the upper portion 94 remains essentially smooth with a relatively constant diameter wall. Tapered convolutions 90 can extend up to 360 degrees in some applications without incurring unwanted levels of turbulence. Finally, by using convolutions 90, tube flexibility is increased versus using convolutions that extend only half way around the tube circumference.

Figure 9:
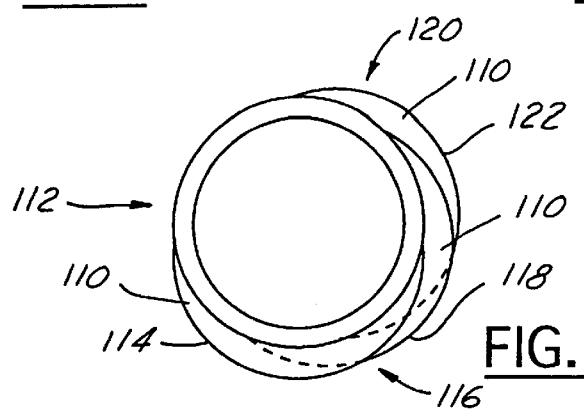
FIG. 9 is a cross-section of a tube having helically indexed convolutions.

FIG. 9 shows another embodiment of the present invention in which convolutions 110 are offset in a helical pattern along a tube 112. Helically indexing convolutions 110 allows for easier twisting of the tube 112 during installation in a vehicle and allows customized flexing in a predetermined plane. Depending on the application, helically offset convolutions 110 may be better for bending around projecting parts than convolutions aligned in a straight orientation.

Tube 112 includes a first convolution 114 that extends roughly half the tube circumference, illustrated as lower tube half 116. A second convolution 118 is circumferentially offset from first convolution 114 but extends approximately the same arcuate length, thereby extending into upper tube half 120 as shown. A third convolution 122 is further circumferentially offset from first and second convolutions 114, 118 and extends approximately the same arcuate length. The pattern of offsets continues for each additional convolution 110 to produce a partial helical pattern of convolutions. Other than the helical pattern of convolutions 110, the tube 112 in FIG. 9 has the same characteristics discussed with regard to any of the previous embodiments.

Figure 10:
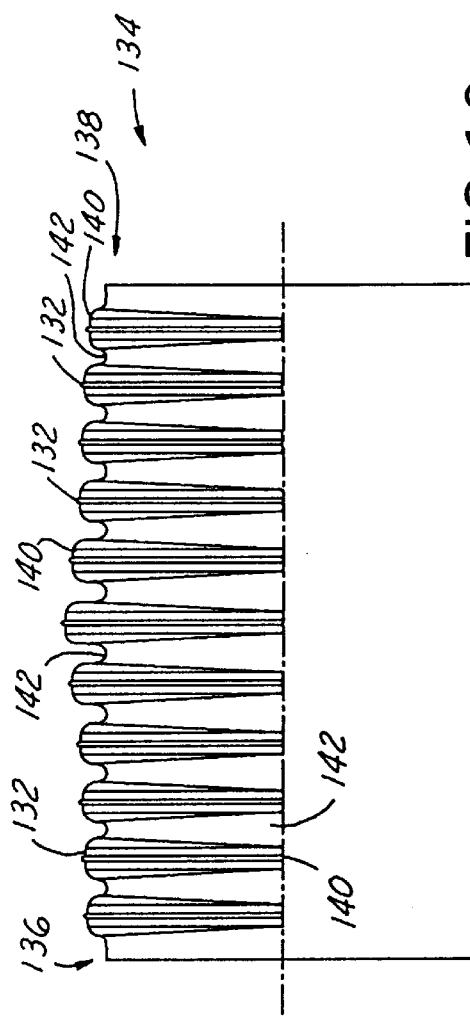
FIG. 10 is a side view of tube having graduated convolutions.

FIG. 10 shows a tube 130 according to the present invention having convolutions 132 which form a hump shape having the largest convolutions 132 in middle region 134 and gradually smaller convolutions 132 traveling out toward first and second end regions 136, 138. Although any convolution design characteristics can be modified to achieve the desired effect, the illustrated convolutions 132 change the distance between peaks 140 and valleys 142. The greater peak to valley distances occur in middle region 134 while the end region convolutions 132 have progressively smaller peak to valley distances.

Another design variation may have convolutions with the longest arcs in the middle region and progressively smaller arc convolutions toward the respective end regions.

Figure 13:
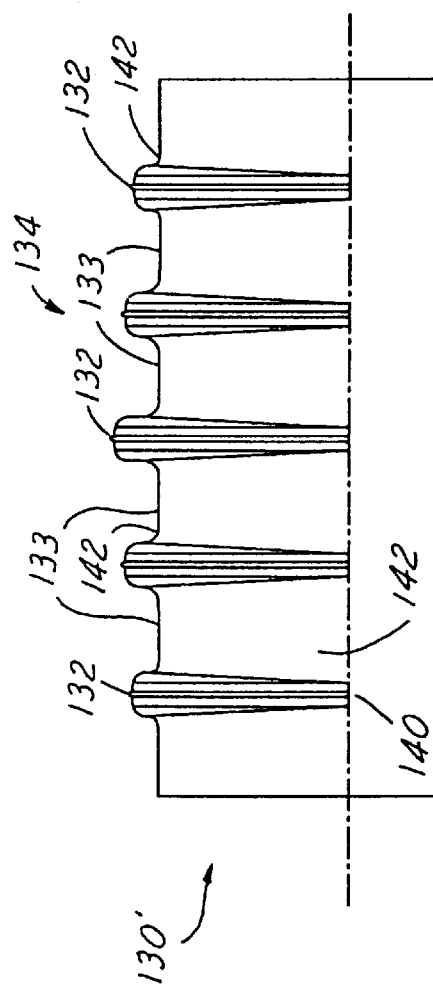
FIG. 13 is a first alternative embodiment of the tube of FIG. 10.
Figure 14:
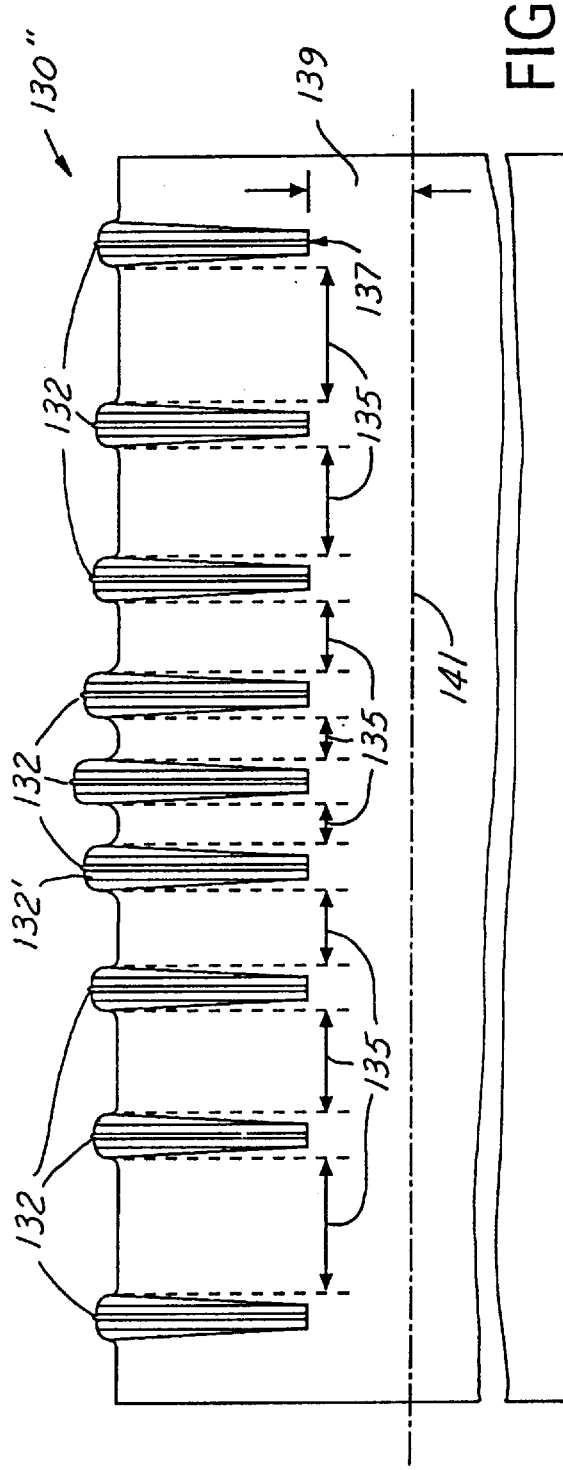
FIG. 14 is a second alternative embodiment of the tube of FIG. 10.

FIGS. 13 and 14 set forth alternative embodiments to the tube shown in FIG. 10. Specifically, the first alternative embodiment set forth in FIG. 13 is similar to that of FIG. 10 except it has convolutions 132 which are spaced further apart from one another as compared to the embodiment of FIG. 10. In these "spaces" are linear segments 133 which separate adjacent convolutions 132. In the second alternative embodiment set forth in FIG. 14, the spacing 135 between adjacent convolutions 132 varies. In the embodiment set forth in FIG. 14, the spacing 135 is the greatest for convolutions 132 distal to central convolute 132' and is the smallest for the convolute's proximate central convolute 132'. Additionally, the embodiment set forth in FIG. 14 differs from the embodiment of FIG. 10 in that the root 137 of each of the convolutes ends, or falls short, 139 of the center line 141 of tube 130".

Figure 11:
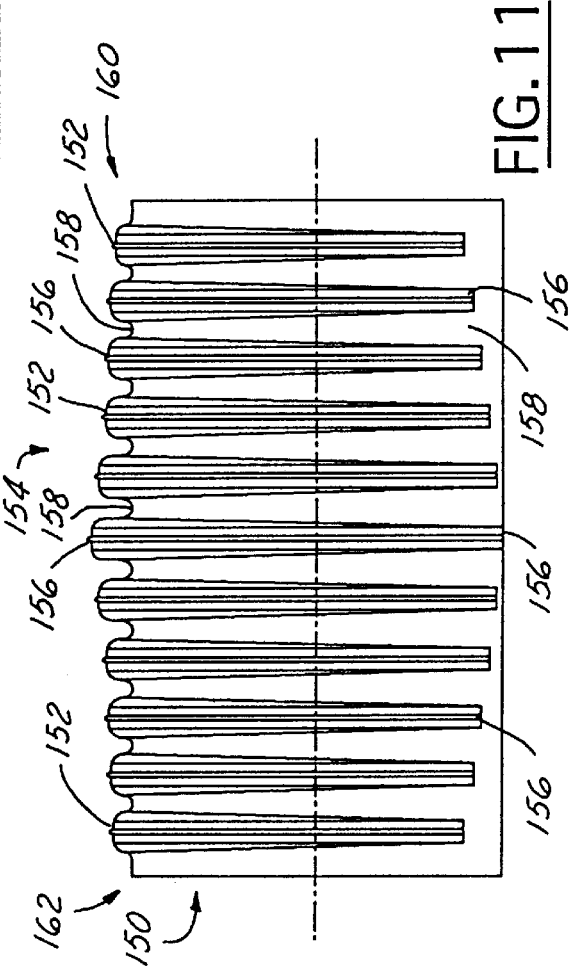
FIG. 11 is a side view of a different tube having tapering graduated convolutions according to the present invention.

FIG. 11 shows a tube 150 having both the peak to valley distances and arc lengths changing. Convolutions 152 in middle region 154 have peaks 156 spaced from valleys 158 the greatest distance and also have the longest arc lengths. Convolutions 152 located toward end regions 160, 162 have progressively shorter peak to valley distances and progressively shorter arc lengths. Such a modifications would provide improved flexing at the most appropriate location along tube 150.

By modifying specific convolution design factors, including width, height, shape, arc length, and spacing, a desired balance between turbulence and flexing can be achieved. Also, the convolutions of the present invention can have any shape that is suitable for their intended use. The peaks of the convolutions can be flat, rounded, pointed, squared, or any other shape.

The present invention can be fabricated using any suitable manufacturing techniques. An extrusion process is preferably employed to fabricate hoses, tubes and lines according to the present invention. One suitable extrusion technique is described in U.S. Pat. No. 5,460,771 hereby incorporated by reference.

To manufacture a hose according to the present invention, extruded tubular material is introduced into a suitable molding device upon exiting an extrusion head. The molding device can comprise a plurality of segmented dies each having an upper half and a lower half movably positioned on a suitable reciprocal rotational means such as caterpillar tracks. The respective segmented die halves are positioned in a sequential fashion to form an elongated internal die cavity. Depressions are selectively provided in the die halves to create partially extending convolutions in the hose. For example, depressions are only provided in one die half to create a convolution that extends less than half the circumference of the hose. Likewise, depressions may be made in both die halves to create helically offset convolutions. The particular geometry of the depressions will be dictated by the particular characteristics of the material being processed and the desired convolution profile and spacing.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A fuel tube suitable for use with vehicles comprising:
   an elongated generally cylindrical main body having a thin wall defined by an inner surface and an outer surface;

said main body fabricated from multiple layers of plastic material and having first and second longitudinal segments, said first longitudinal segment having a generally constant cylindrical cross-section wherein said inner surface is approximately parallel to said outer surface; and said second longitudinal segment having a variable cross-section including a first region having a constant diameter wall and a second region having a variable diameter wall diametrically opposite said constant diameter wall, said second region including at least two asymmetric convolutions in said wall spaced longitudinally from one another, each convolution extending circumferentially around said tube defining an arc of less than approximately 360 degrees for allowing bending of said tube for facilitating connection to a fuel tank, wherein each convolution has tapered sides converging toward one another adjacent at least one circumferential terminal end of each asymmetric convolution.

2. The tube of claim 1, said tube being capable of bending so as to define an inner radius portion and an outer radius portion and said at least one convolution being located at said inner radius portion.

3. The tube of claim 1, wherein said convolution has a longitudinal cross-sectional profile having one of an angled, squared and sinusoidal shape.

4. The tube of claim 1, wherein said at least one convolution extends circumferentially around said tube defining an arc extending approximately 45 to 315 degrees.

5. The tube of claim 4, wherein said arc extends approximately one half of the circumference of said tube.

6. The tube of claim 1, wherein said second region has a plurality of convolutions, each of said convolutions being aligned in a same orientation relative to one another in a longitudinal direction.

7. The tube of claim 1, wherein said second region has convolutions having an indexed, offset helical pattern in a longitudinal direction, while maintaining a continuous substantially smooth longitudinally extending portion opposite from said asymmetric convolutions.

8. The tube of claim 1, wherein at least one of said asymmetric convolutions has parallel sides.

9. The tube of claim 1, wherein said tube has plural convolutions, one group of said convolutions having parallel sides and another group having tapered sides.

10. A fuel tube suitable for use with vehicles comprising:

an elongated generally cylindrical main body fabricated from at least one layer of plastic material and having a thin wall defined by an inner surface and an outer surface;

a plurality of convolutions positioned at predetermined locations and extending, less than the entire circumference of said tube such that said inner surface of said wall includes a substantially smooth longitudinal portion located opposite a substantially irregular longitudinal portion which includes said convolutions; and wherein said convolutions are positioned spaced longitudinally from one another along said substantially irregular longitudinal portion and helically indexed with respect to one another in an offset pattern such that adjacent convolutions have circumferential terminal ends angularly offset from one another while maintaining said substantially smooth longitudinal portion along a continuous longitudinal path opposite from said substantially irregular longitudinal portion for allowing easier twisting of the fuel tube around obstructions.

11. The tube of claim 10, wherein said tube comprises multiple layers of plastic material.

12. The tube of claim 10, wherein each convolution has tapered sides converging toward one another adjacent at least one circumferential terminal end of each convolution.

13. The tube of claim 10, wherein said tube is designed to have a bend such that an inner radius of said bend includes said convolutions and said outer radius includes said substantially smooth longitudinal portion.

14. The tube of claim 13, wherein said convolutions extend circumferentially around said tube defining an arc of approximately 45 to 350 degrees.

15. The tube of claim 14, wherein said arc extends approximately one half of the circumference of said tube.

16. A fuel tube suitable for use with vehicles comprising:

an elongated generally cylindrical main body having a thin wall defined by an inner surface and an outer surface;

said main body fabricated from at least one layer of synthetic plastic material and having first and second longitudinal segments, said first longitudinal segment having a generally constant cylindrical cross-section wherein said inner surface is approximately parallel to said outer surface;

said second longitudinal segment having a variable cross-section including a first region having a generally constant diameter inner surface and a second region having a variable diameter inner surface diametrically opposite said constant diameter inner surface, said second region including at least one convolution in said wall;

said tube being capable of bending so as to define an inner radius portion and an outer radius portion and said at least one asymmetric convolution being located at said inner radius portion; and wherein said at least one convolution further comprises plural convolutions, each said convolution being defined by a peak connected to a pair of laterally spaced apart valleys by tapered side walls and includes a groove located between said valleys such that a distance from said peak to said valleys decreases to approximately zero in said first region and said groove has a size that is substantially greater in said second region than said first region, wherein each of said convolutions has an arc length and said arc lengths are progressively shorter toward said first region.

* * * * *